(12) United States Patent
Ji

(10) Patent No.: US 11,086,540 B2
(45) Date of Patent: Aug. 10, 2021

(54) MEMORY SYSTEM, MEMORY CONTROLLER AND MEMORY DEVICE FOR CONFIGURING SUPER BLOCKS

(71) Applicant: SK hynix Inc., Gyeonggi-do (KR)

(72) Inventor: Seung-Gu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/687,000

(22) Filed: Nov. 18, 2019

(65) Prior Publication Data
US 2020/0363955 A1 Nov. 19, 2020

(30) Foreign Application Priority Data

May 15, 2019 (KR) .......................... 10-2019-0057230

(51) Int. Cl.
*G06F 3/06* (2006.01)
(52) U.S. Cl.
CPC .............. *G06F 3/064* (2013.01); *G06F 3/061* (2013.01); *G06F 3/0653* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 10,019,173 B1* | 7/2018 | Roh | ....................... | G06F 3/0625 |
| 2011/0283049 A1* | 11/2011 | Kang | ..................... | G11C 16/16 |
| | | | | 711/103 |
| 2012/0047409 A1* | 2/2012 | Post | ....................... | G11C 29/82 |
| | | | | 714/718 |
| 2015/0043277 A1* | 2/2015 | Fitzpatrick | .............. | G06F 3/064 |
| | | | | 365/185.11 |
| 2015/0301744 A1* | 10/2015 | Kim | ....................... | G06F 3/0634 |
| | | | | 711/103 |
| 2016/0283138 A1* | 9/2016 | Lehman | ................. | G06F 3/0688 |
| 2017/0286286 A1* | 10/2017 | Szubbocsev | .......... | G06F 3/0688 |
| 2018/0121097 A1* | 5/2018 | Kim | ....................... | G06F 3/0604 |
| 2018/0349243 A1* | 12/2018 | Shin | ........................ | G06F 1/206 |
| 2019/0250822 A1* | 8/2019 | Choi | ....................... | G06F 3/0611 |

FOREIGN PATENT DOCUMENTS

| KR | 10-2018-0047329 | 5/2018 |
|---|---|---|
| KR | 10-2018-0121794 | 11/2018 |

* cited by examiner

*Primary Examiner* — J. H. Hur
(74) *Attorney, Agent, or Firm* — IP & T Group LLP

(57) ABSTRACT

A memory system, a memory controller and a memory device are provided. The memory controller groups a first set of a plurality of memory blocks into a first super block, and a number of memory dies corresponding to the first super block is less than a number of memory dies corresponding to one channel and the number of memory dies corresponding to the first super block is determined differently depending on which of one or more control parameters are received by the memory controller. Through this, it is possible to provide a memory system, a memory controller and a memory device which can flexibly configure a super block while improving the performance of a read, program or erase operation for the super block.

17 Claims, 14 Drawing Sheets

MEMORY SYSTEM, MEMORY CONTROLLER AND MEMORY DEVICE FOR CONFIGURING SUPER BLOCKS

CROSS-REFERENCE TO RELATED APPLICATION

The present application claims priority under 35 U.S.C. 119(a) to Korean Patent Application No. 10-2019-0057230, filed on May 15, 2019, which is incorporated herein by reference in its entirety.

BACKGROUND

1. Technical Field

Various embodiments generally relate to a memory system, a memory controller and a memory device.

2. Related Art

A memory system stores data based on a request of a host, such as a computer, a mobile terminal such as a smartphone and a tablet, or any of various other electronic devices. The memory system may be of a type that stores data in a magnetic disk, such as a hard disk drive (HDD), or of a type that stores data in a nonvolatile memory, such as a solid state drive (SDD), a universal flash storage (UFS) device or an embedded MMC (eMMC) device.

The memory system may include a memory device configured as a magnetic disk or a nonvolatile memory, and may further include a memory controller for controlling the memory device. The memory controller may receive a command from the host, and may perform or control an operation for reading, writing or erasing data with respect to the memory device based on the received command.

The memory device may include a plurality of memory blocks, and the memory system may group the plurality of memory blocks into a plurality of super blocks. The memory system may efficiently manage the plurality of memory blocks by managing the memory device in units of super blocks.

SUMMARY

Various embodiments are directed to a memory system, a memory controller and a memory device which can flexibly configure a super block while improving the performance of a read, program or erase operation for the super block.

Also, various embodiments are directed to a memory system, a memory controller and a memory device which can increase the efficiency of a background operation such as garbage collection or wear leveling.

In one aspect, embodiments of the disclosure may provide a memory system including: a memory device including a plurality of memory dies including respective groups of memory blocks, which collectively define a plurality of memory blocks in the memory device; and a memory controller configured to control the memory device.

The memory device may include a plurality of memory dies, and at least two of the plurality of memory dies may correspond to one channel.

The memory controller may group a first set of the plurality of memory blocks into a first super block.

The plurality of memory blocks may include one or more first memory blocks and one or more second memory blocks.

The first super block may include at least one first memory block and at least one second memory block.

A first memory die which includes at least one first memory block and a second memory die which includes at least one second memory block may be different from each other.

A number of memory dies corresponding to the first super block may be less than a number of memory dies corresponding to the channel, and the number of memory dies corresponding to the first super block may be determined differently depending on which of one or more control parameters are received by the memory controller.

The memory controller may group a second set of the plurality of memory blocks into a second super block different from the first super block. A number of memory blocks in the first super block may be different from a number of memory blocks in the second super block.

At least one of the one or more control parameters may be dynamically indicated by a command received from a host.

The one or more control parameters may include a maximum power budget information on the memory device.

The one or more control parameters may include at least one of a maximum data communication speed between the memory controller and a host and a maximum data communication speed between the memory controller and the memory device.

The one or more control parameters may further include one or more of a program time, a read sensing time and a data output time of each of the memory blocks in the first super block.

The number of memory dies corresponding to the first super block may be determined differently depending on a value obtained by weighting the program time with a first weight, and a value obtained by weighting the read sensing time with a second weight.

The first weight and the second weight may be determined by a control ratio that varies depending on a ratio of a program operation count to a read operation count for the first super block for a specific amount of time or a ratio of a program data size to a read data size for the first super block for the specific amount of time.

The number of memory dies corresponding to the first super block may vary depending on the program time regardless of the read sensing time, when the control ratio is equal to or greater than a first threshold ratio.

The number of memory dies corresponding to the first super block may vary depending on the read sensing time regardless of the program time, when the control ratio is equal to or less than a second threshold ratio. The second threshold ratio may be less than the first threshold ratio.

In another aspect, embodiments of the disclosure may provide a memory controller including: a memory interface configured to communicate with a memory device including a plurality of memory dies including respective groups of memory blocks, which collectively define a plurality of memory blocks in the memory device; and a control circuit configured to control the memory device.

The memory device may include a plurality of memory dies and at least two of the plurality of memory dies may correspond to one channel.

The control circuit may group a first set of the plurality of memory blocks into a first super block.

The plurality of memory blocks may include one or more first memory blocks and one or more second memory blocks.

The first super block may include at least one first memory block and at least one second memory block.

A first memory die which includes at least one first memory block and a second memory die which includes at least one second memory block may be different from each other.

A number of memory dies corresponding to the first super block may be less than a number of memory dies corresponding to the channel, and the number of memory dies corresponding to the first super block may be determined differently depending on which of one or more control parameters are received by the control circuit.

The control circuit may group a second set of the plurality of memory blocks into a second super block different from the first super block. A number of memory blocks in the first super block may be different from a number of memory blocks in the second super block.

The one or more control parameters may include at least one of a maximum data communication speed between the memory controller and a host and a maximum data communication speed between the memory controller and the memory device.

The one or more control parameters may further include one or more of a program time, a read sensing time and a data output time of each of the memory blocks in the first super block.

The number of memory dies corresponding to the first super block may be determined differently depending on a value obtained by weighting the program time with a first weight, and a value obtained by weighting the read sensing time with a second weight.

In still another aspect, embodiments of the disclosure may provide a memory device including: a plurality of memory blocks, wherein the memory device includes a plurality of memory dies each including respective groups of memory blocks, which collectively define a plurality of memory blocks of the memory device.

At least two of the plurality of memory dies may correspond to one channel.

The plurality of memory blocks may include one or more first memory blocks and one or more second memory blocks, and a first set of the plurality of memory blocks may be grouped into a first super block.

The first super block may include at least one first memory block and at least one second memory block.

A first memory die which includes at least one first memory block and a second memory die which includes at least one second memory block may be different from each other.

A number of memory dies corresponding to the first super block may be less than a number of memory dies corresponding to the channel, and the number of memory dies corresponding to the first super block may be determined differently depending on which of one or more control parameters are applied.

A second set of the plurality of memory blocks may be grouped into a second super block different from the first super block, and a number of memory blocks in the first super block may be different from a number of memory blocks in the second super block.

The one or more control parameters may include at least one of a maximum data communication speed between a memory controller and a host and a maximum data communication speed between the memory controller and the memory device.

The one or more control parameters may further include one or more of a program time, a read sensing time and a data output time of each of the memory blocks in the first super block.

The number of memory dies corresponding to the first super block may be determined differently depending on a value obtained by weighting the program time with a first weight, and a value obtained by weighting the read sensing time with a second weight.

In still another aspect, embodiments of the disclosure may provide a memory system including: a memory device including plural dies each having plural memory blocks and a controller.

The controller may configure a super block by selecting at least one of the memory blocks from each of a specific number of dies, which specific number is at least two.

The controller may determine the specific number of dies based on one or more pieces of information.

The pieces of information may include a maximum power budget of the memory device.

The pieces of information may include a communication speed between the controller and a host.

The pieces of information may include a communication speed between the controller and the memory device.

The pieces of information may include an operation-based time (e.g. program time/read sensing time/data output time) of a memory block in the super block.

The embodiments of the disclosure may provide a memory system, a memory controller and a memory device which can flexibly configure a super block while improving the performance of a read, program or erase operation for the super block.

Also, the embodiments of the disclosure may provide a memory system, a memory controller and a memory device which can increase the efficiency of a background operation such as garbage collection or wear leveling.

DETAILED DESCRIPTION

Figure 1:
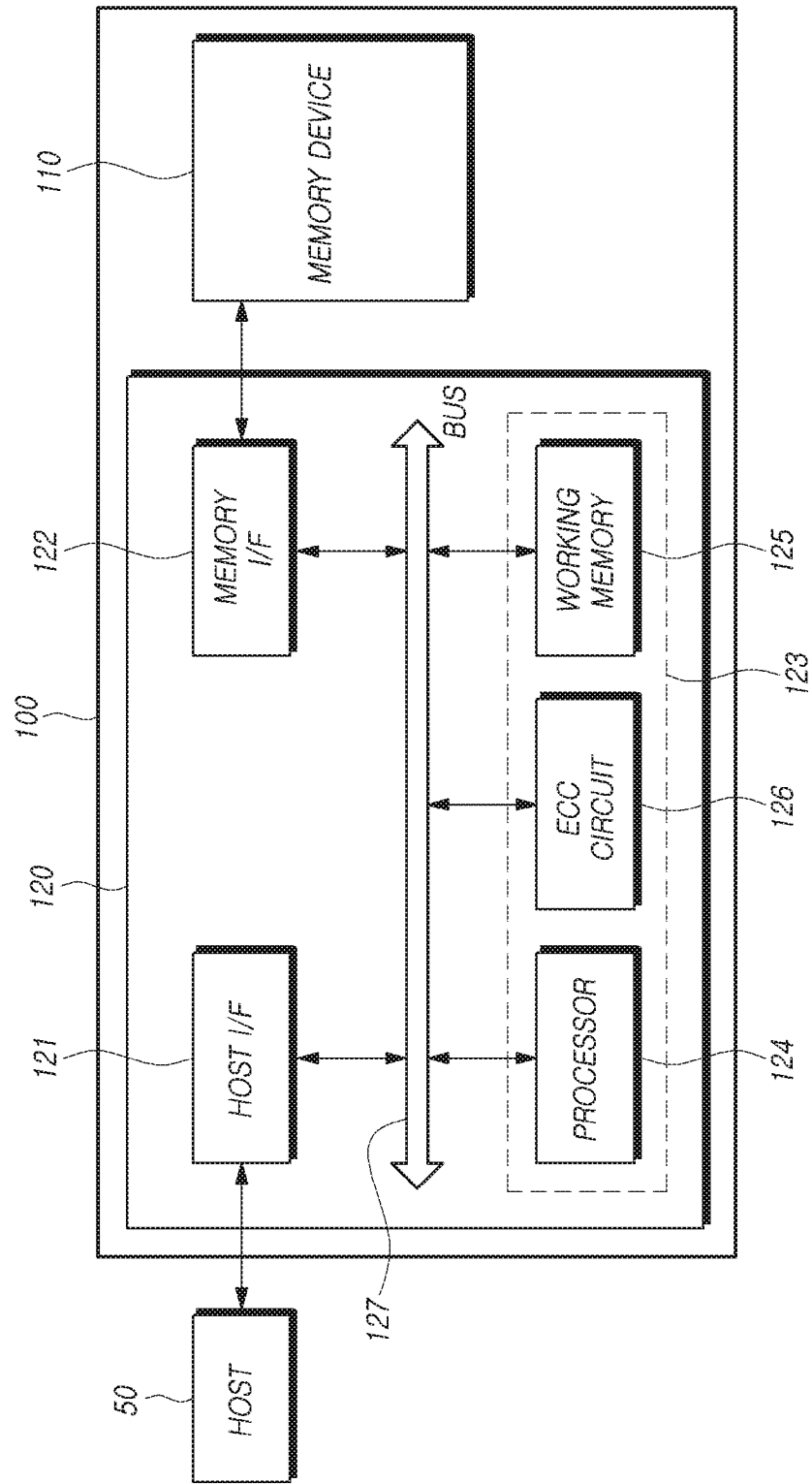
FIG. 1 is a block diagram schematically illustrating a memory system in accordance with an embodiment of the disclosure.

Various embodiments of the disclosure are described in detail below with reference to the accompanying drawings. In the following description, the same elements are designated by the same reference numerals throughout the drawings. Further, in the following description of the disclosure, well-known technical information may be omitted so as not to obscure features and aspects of the present invention. Also, open-ended terms such as "comprising," "having," "including" and the like, used in the description and claims, should not be interpreted as being restricted to the stated elements or operations, unless specifically stated otherwise. Where an indefinite or definite article is used in referring to a singular noun, e.g. "a," "an," "the," this may include a plural of that noun unless specifically stated otherwise.

Also, in describing the components of the disclosure, there may be terms used like first, second, A, B, (a), and (b). These are solely for the purpose of differentiating one component from the other but not to imply or suggest the substances, order, sequence or number of the components.

In describing positional relationships of components, the terms "connected," "coupled" or "linked," may indicate that components are directly or indirectly "connected," "coupled" or linked.

In describing time flow relationships of operations or events using, for example, "after," "following," "next" or "before," non-continuous cases may be included unless "immediately" or "directly" is used.

In the case where a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

A memory system, a memory controller and a memory device are described below in detail with reference to the accompanying drawings through various embodiments of the disclosure. Throughout the specification, reference to "an embodiment" or the like is not necessarily to only one embodiment, and different references to any such phrase are not necessarily to the same embodiment(s).

FIG. 1 is a block diagram schematically illustrating a memory system 100.

Referring to FIG. 1, the memory system 100 may include a memory device 110 which stores data, and a memory controller 120 which controls the memory device 110.

The memory device 110 includes a plurality of memory blocks and operates in response to the control of the memory controller 120. Operations of the memory device 110 may include, for example, a read operation, a program operation (also referred to as a write operation) and an erase operation.

The memory device 110 may include a memory cell array including a plurality of memory cells which store data. Such a memory cell array may exist in a memory block.

For example, the memory device 110 may be realized by a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The memory device 110 may be realized in a three-dimensional array structure. The embodiments of the disclosure may be applied to not only a flash memory device in which a charge storage layer is configured by a conductive floating gate but also a charge trap flash (CTF) in which a charge storage layer is configured by a dielectric layer.

The memory device 110 is configured to receive a command and an address from the memory controller 120 and access a region in the memory cell array which is selected by the address. In other words, the memory device 110 may perform an operation, corresponding to the command, for a region selected by the address.

For example, the memory device 110 may perform a program operation, a read operation and an erase operation. In this connection, in the program operation, the memory device 110 may program data in a region selected by the address. In the read operation, the memory device 110 may read data from a region selected by the address. In the erase operation, the memory device 110 may erase data stored in a region selected by the address.

The memory controller 120 may control the operation of the memory device 110 according to a request of a host (HOST) 50 or regardless of a request of the host 50.

For example, the memory controller 120 may control write (program), read, erase and background operations for the memory device 110. For example, the background operation may be a garbage collection (GC) operation, a wear leveling (WL) operation, a bad block management (BBM) operation, or the like.

Referring to FIG. 1, the memory controller 120 may include a host interface 121, a memory interface 122, and a control circuit 123.

The host interface 121 provides an interface for communication with the host 50. When receiving a command from the host 50, the control circuit 123 may receive the command through the host interface 121, and then, may perform an operation of processing the received command.

The memory interface 122 is coupled with the memory device 110 and thereby provides an interface for communication with the memory device 110. That is to say, the memory interface 122 may be configured to provide the interface between the memory device 110 and the memory controller 120 in response to the control of the control circuit 123.

The control circuit 123 performs the general control operations of the memory controller 120, thereby controlling the operations of the memory device 110. To this end, for instance, the control circuit 123 may include at least one of a processor 124 and a working memory 125, and as the case may be, may further include an error detection and correction circuit (ECC circuit) 126.

The processor 124 may control general operations of the memory controller 120, and may perform a logic calculation. The processor 124 may communicate with the host 50 through the host interface 121, and may communicate with the memory device 110 through the memory interface 122.

The processor 124 may perform the function of a flash translation layer (FTL). The processor 124 may translate a logical block address (LBA), provided by the host 50, into a physical block address (PBA), through the flash translation layer (FTL). The flash translation layer (FTL) may receive the logical block address (LBA) and translate it into the physical block address (PBA), by using a mapping table. There are various address mapping methods of the flash translation layer, depending on a mapping unit. Representative address mapping methods include a page mapping method, a block mapping method and a hybrid mapping method.

The processor 124 is configured to randomize data received from the host 50. For example, the processor 124 may randomize data received from the host 50, by using a randomizing seed. Randomized data to be stored is provided to the memory device 110 and is programmed to the memory cell array.

The processor 124 is configured to derandomize data received from the memory device 110, in a read operation. For example, the processor 124 may derandomize data received from the memory device 110, by using a derandomizing seed. Derandomized data may be outputted to the host 50.

The processor 124 may control the operation of the memory controller 120 by executing firmware. In other words, in order to control general operations of the memory controller 120 and perform a logic calculation, the processor 124 may execute (drive) firmware loaded to the working memory 125 upon booting. For instance, the firmware may be stored in the memory device 110 and be loaded to the working memory 125.

The firmware as a program executed in the memory system 100 may include, for example, a flash translation layer (FTL) which performs a converting function between a logical address requested by the memory system 100 from the host 50 and a physical address of the memory device 110, a host interface layer (HIL) which serves to analyze a command requested to the memory system 100 as a storage device from the host 50 and transfers the command to the flash translation layer (FTL), and a flash interface layer (FIL) which transfers a command instructed from the flash translation layer (FTL) to the memory device 110.

The working memory 125 may store firmware, program code, a command and data to drive the memory controller 120.

The working memory 125, for example, as a volatile memory, may include at least one among an SRAM (static RAM), a DRAM (dynamic RAM) and an SDRAM (synchronous DRAM).

The error detection and correction circuit 126 may be configured to detect an error bit of data stored in the working memory 125 (that is, read data transferred from the memory device 110) by using an error correction code and correct the detected error bit.

The error detection and correction circuit 126 may be realized to decode data by using an error correction code. The error detection and correction circuit 126 may be realized by any of various code decoders. For example, a decoder which performs unsystematic code decoding or a decoder which performs systematic code decoding may be used.

For example, the error detection and correction circuit 126 may detect an error bit for each read data, in the unit of sector. Namely, each read data may be constituted by a plurality of sectors. A sector may mean a data unit smaller than a page as a read unit of a flash memory. Sectors constituting each read data may be matched with one another by the medium of an address.

The error detection and correction circuit 126 may calculate a bit error rate (BER), and may determine whether an error is correctable or not, in the unit of sector. For example, in the case where a bit error rate (BER) is higher than a reference value, the error detection and correction circuit 126 may determine a corresponding sector as being uncorrectable or a fail. On the other hand, in the case where a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable as the last. There may be one or more sectors that are determined to be uncorrectable. The error detection and correction circuit 126 may transfer information (for example, an address information) on a sector, which is determined to be uncorrectable, to the processor 124.

A bus 127 may be configured to provide channels among the components 121, 122, 124, 125 and 126 of the memory controller 120. The bus 127 may include, for example, a control bus for transferring various control signals, commands and the likes, a data bus for transferring various data, and the like.

The above-described components 121, 122, 124, 125 and 126 of the memory controller 120 are illustrated by way of example only. Not all such components are necessarily needed in each embodiment, and the functions of one or more such components may be combined into a single component. Of course, as those skilled in the art will understand, the memory controller 120 may include additional components not illustrated in FIG. 1.

The memory device 110 is described in further detail with reference to FIG. 2 below.

Figure 2:
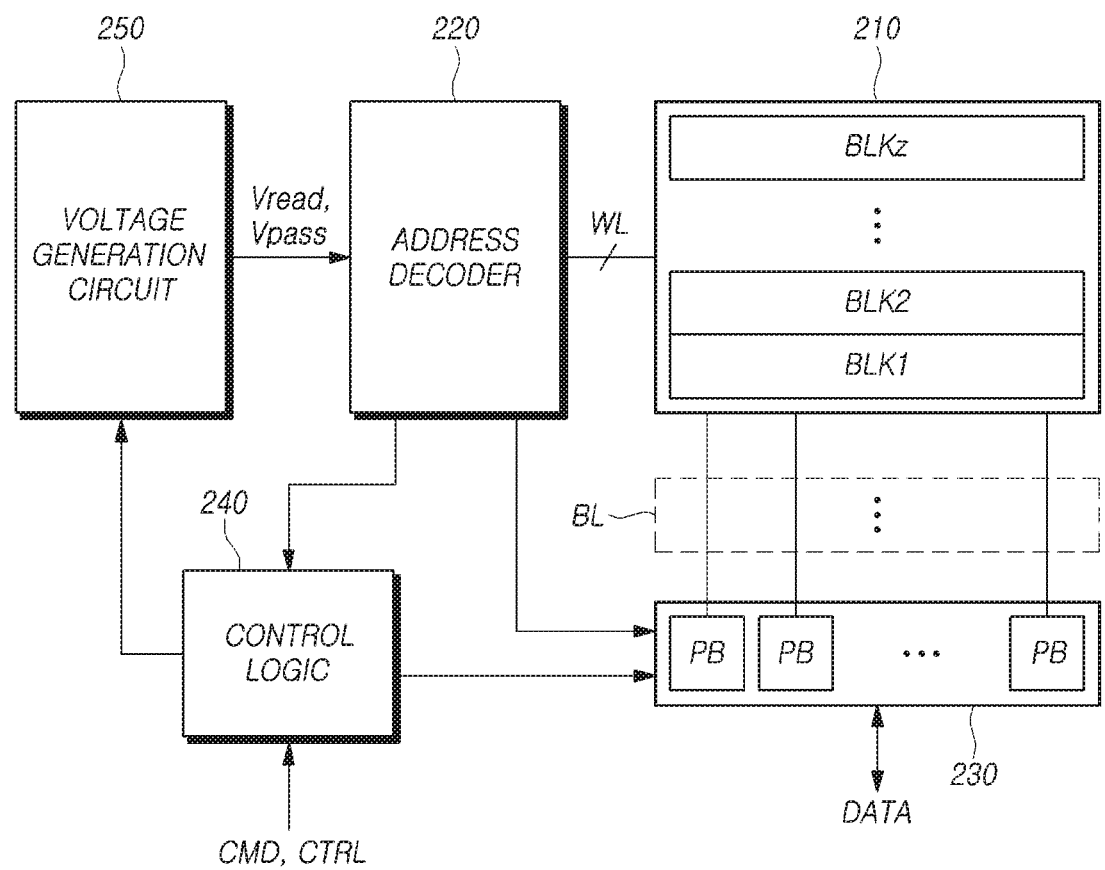
FIG. 2 is a block diagram schematically illustrating a memory device in accordance with an embodiment of the disclosure.

FIG. 2 is a block diagram schematically illustrating the memory device 110 in accordance with an embodiment of the disclosure.

Referring to FIG. 2, the memory device 110 may include a memory cell array 210, an address decoder 220, a read and write circuit 230, control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. For example, the plurality of memory cells may be nonvolatile memory cells, which may have vertical channel structures. The memory cell array 210 may be configured as a two-dimensional structure, or as the case may be, as a three-dimensional structure.

Each of the plurality of memory cells included in the memory cell array may store at least 1-bit data. For instance, each of the plurality of memory cells included in the memory cell array 210 may be a signal level cell (SLC) which stores 1-bit data. For another instance, each of the plurality of memory cells included in the memory cell array 210 may be a multi-level cell (MLC) which stores 2-bit data. For another instance, each of the plurality of memory cells included in the memory cell array 210 may be a triple level cell (TLC) which stores 3-bit data. For another instance, each of the plurality of memory cells included in the memory cell array 210 may be a quad level cell (QLC) which stores 4-bit data. For still yet another instance, the memory cell array 210 may include a plurality of memory cells, each of which stores 5 or more-bit data.

Referring to FIG. 2, the address decoder 220, the read and write circuit 230, the control logic 240 and the voltage generation circuit 250 may collectively operate as a peripheral circuit which drives the memory cell array 210.

The address decoder 220 may be coupled to the memory cell array 210 through the plurality of word lines WL. The address decoder 220 may be configured to operate in response to the control of the control logic 240. The address decoder 220 may receive an address through an input/output buffer in the memory device 110.

The address decoder 220 may be configured to decode a block address in the received address. The address decoder 220 may select at least one memory block depending on the decoded block address. The address decoder 220 may apply a read voltage Vread generated in the voltage generation circuit 250 to a word line selected in a memory block selected in a read voltage applying operation during a read operation, and may apply a pass voltage Vpass to the remaining unselected word lines. Further, the address decoder 220 may apply a verify voltage generated in the voltage generation circuit 250 to a word line selected in a selected memory block in a program verify operation, and may apply the pass voltage Vpass to the remaining unselected word lines.

The address decoder 220 may be configured to decode a column address in the received address. The address decoder 220 may transmit the decoded column address to the read and write circuit 230.

A read operation and a program operation of the memory device 110 may be performed in the unit of page. An address received when a read operation or a program operation is requested may include a block address, a row address and a column address.

The address decoder 220 may select one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may include a page buffer circuit or a data register circuit. For example, the data register circuit may include a data buffer for performing a data processing function, and as the case may be, may further include a cache buffer for performing a caching function.

The plurality of page buffers PB may be coupled to the memory cell array 210 through the plurality of bit lines BL. The plurality of page buffers PB may continuously supply sensing current to bit lines coupled with memory cells to sense the threshold voltages (Vth) of the memory cells in a read operation and a program verify operation, and may latch sensing data by sensing, through sensing nodes, that the amounts of current flowing depending on the programmed states of the corresponding memory cells are changed. The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. In an embodiment, the read and write circuit 230 may include a column select circuit in addition to the page buffers (or page registers).

The control logic 240 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. Further, the control logic 240 may output a control signal for adjusting the precharge potential levels of the sensing nodes of the plurality of page buffers PB.

The control logic 240 may control the read and write circuit 230 to perform a read operation of the memory cell array 210.

The voltage generation circuit 250 may generate the read voltage Vread and the pass voltage Vpass in a read operation in response to a voltage generation circuit control signal outputted from the control logic 240.

Figure 3:
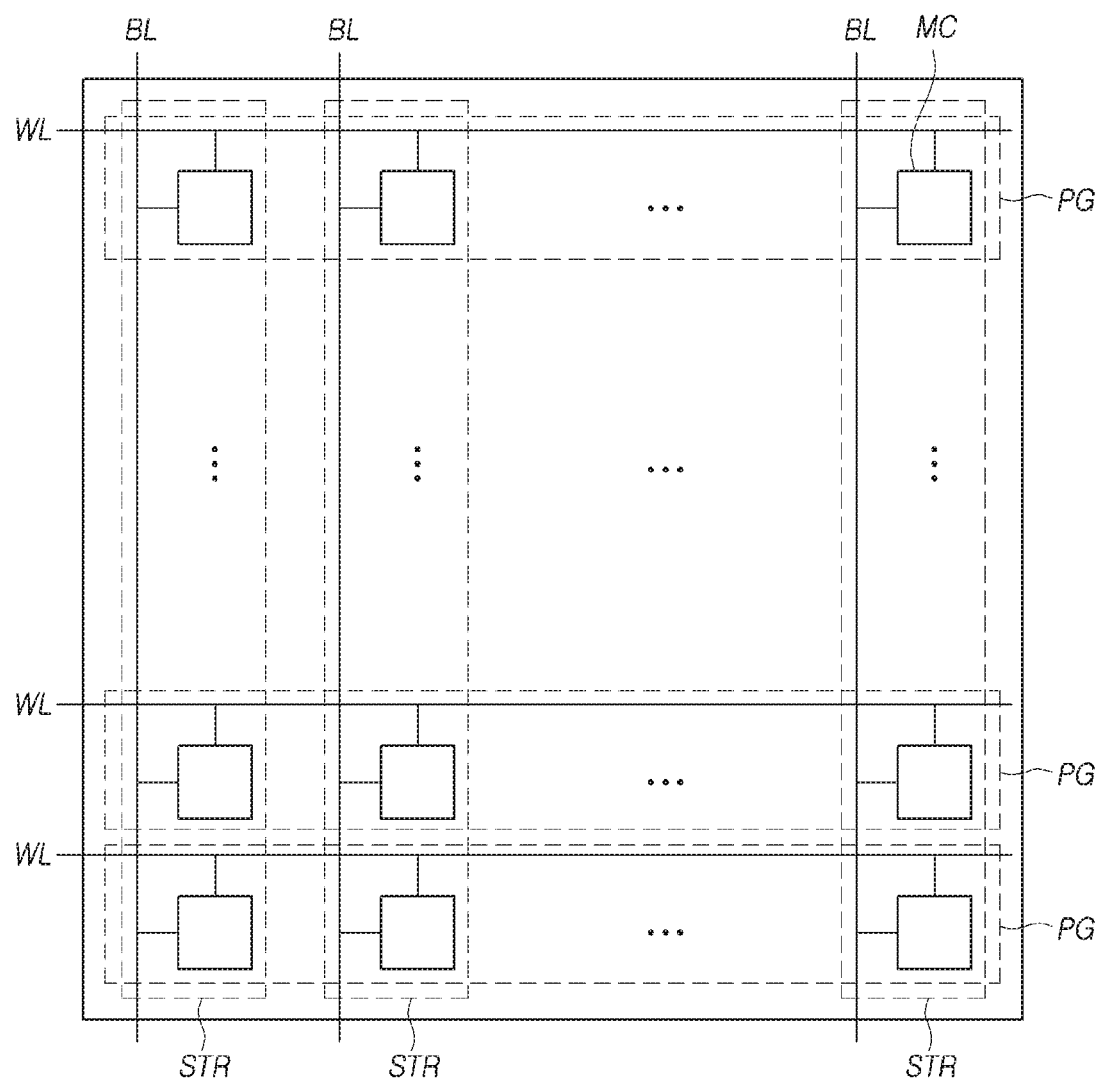
FIG. 3 is a diagram schematically illustrating a memory block of the memory device in accordance with an embodiment of the disclosure.

FIG. 3 is a diagram schematically illustrating one of the plurality of memory blocks BLK1 to BLKz of the memory device 110 in accordance with an embodiment of the disclosure.

Referring to FIG. 3, each of the plurality of memory blocks BLK1 to BLKz may be configured as a plurality of pages PG and a plurality of strings STR are disposed in the form of a matrix.

The plurality of pages PG correspond to a plurality of word lines WL, and the plurality of strings STR correspond to a plurality of bit lines BL.

That is to say, in each of the plurality of memory blocks BLK1 to BLKz, the plurality of word lines WL and the plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A plurality of memory cells MC may be defined at respective intersections of the word lines WL and bit lines BL. A transistor may be disposed in each memory cell MC. For example, the transistor disposed in each memory cell MC may include a drain, a source and a gate. The drain (or the source) of the transistor may be coupled directly or via one or more other transistors with a corresponding bit line, the source (or the drain) of the transistor may be coupled directly or via one or more other transistors with a source line (which may be the ground), and the gate of the transistor may include a floating gate which is surrounded by a dielectric and a control gate to which a gate voltage is applied.

A read operation and a program operation (write operation) may be performed in the unit of page, and an erase operation may be performed in the unit of memory block.

Referring to FIG. 3, in each of the plurality of memory blocks BLK1 to BLKz, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be disposed between the first outermost word line and the first select line. At least one dummy word line may also be additionally disposed between the second outermost word line and the second select line.

Figure 4:
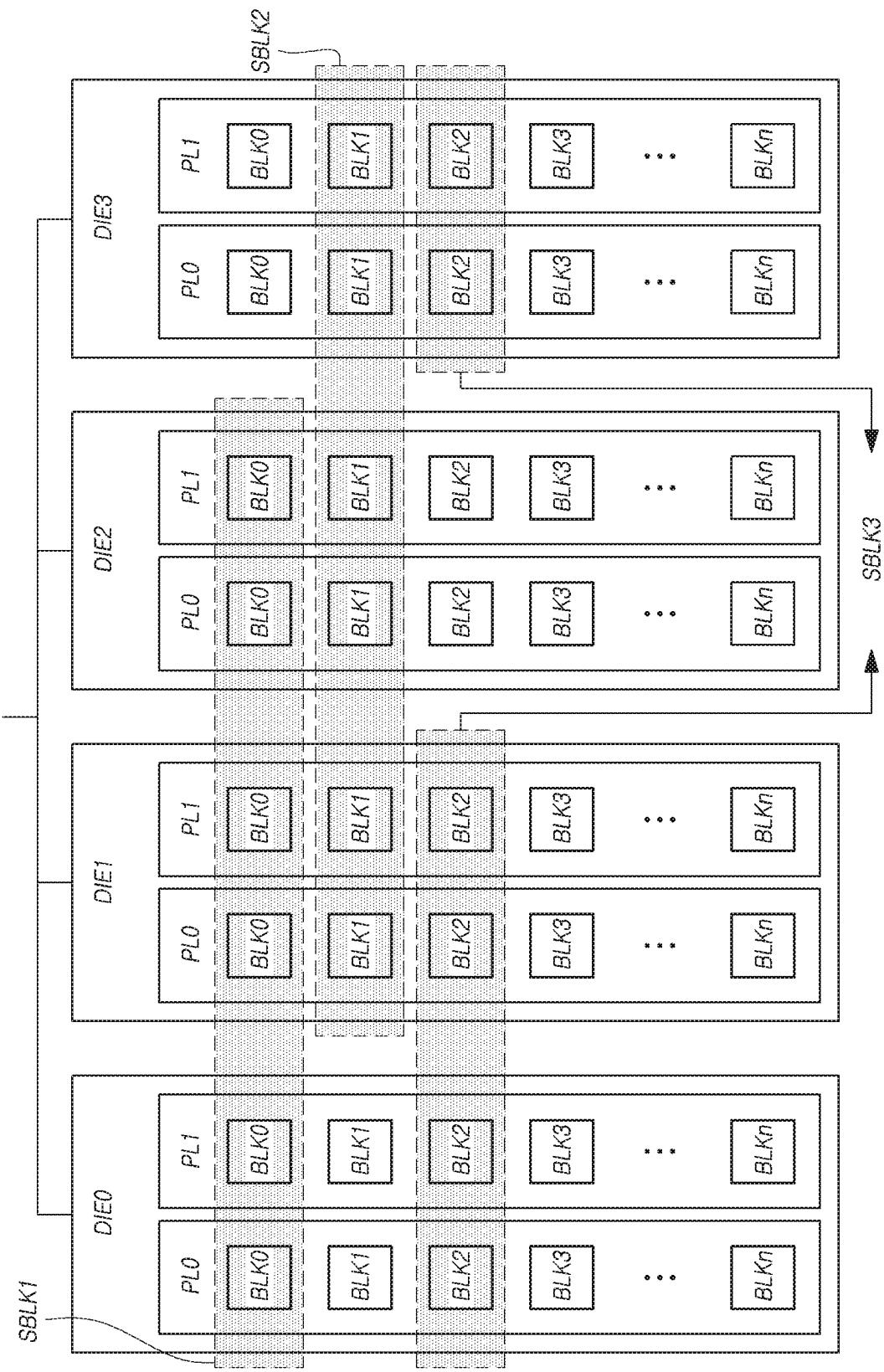
FIG. 4 is a diagram illustrating configuring super blocks in the memory system in accordance with an embodiment of the disclosure.

FIG. 4 is a diagram illustrating configuring super blocks in the memory system 100 in accordance with an embodiment of the disclosure.

According to the illustration of FIG. 4, the memory device 110 may include four memory dies DIE0, DIE1, DIE2 and DIE3. Each of the four memory dies DIE0, DIE1, DIE2 and DIE3 may include two planes PL0 and PL1, and each of the two planes PL0 and PL1 may include a plurality of memory blocks BLK0, BLK1, BLK2, . . . , BLKn.

Some or all of the plurality of memory dies included in the memory device 110 may correspond to one channel CH. According to the illustration of FIG. 4, the four memory dies DIE0, DIE1, DIE2 and DIE3 correspond to one channel. That is to say, an operation (e.g., read/program/erase) for the four memory dies DIE0, DIE1, DIE2 and DIE3 may be performed through one channel. The number of memory dies corresponding to a particular super block (described below) may be less than the number of dies corresponding to a channel.

The channel CH may represent various features, such as a path used to exchange data or commands between the memory controller 120 and the memory device 110, a transmission/reception method through the path and/or definition information (e.g., a protocol) of the path. As the case may be, the channel CH may be included in the memory interface 122 of FIG. 1.

In the case where a plurality of channels exist, operations of exchanging data or commands may be performed in an interconnected manner among the plurality of channels or may be performed independently for each channel.

For instance, the memory controller 120 may sequentially exchange data or commands with the memory device 110 through one channel at a certain time. In this case, the memory controller 120 may not exchange data or commands in parallel. Therefore, different memory dies corresponding to one channel may not process in parallel operations corresponding to different commands.

On the other hand, the memory controller 120 may exchange data or commands with the memory device 110 independently or in parallel through different channels. Therefore, different memory dies corresponding to different channels may process independently or in parallel operations corresponding to different commands.

The memory controller 120 may optionally configure a unit of operation for an efficient operation. For example, the memory controller 120 may group some (which may be memory blocks in one memory die or at least two memory dies) among the plurality of memory blocks in the memory device 110, into one super block. The grouping operation may be performed by the control circuit 123 in the memory controller 120.

The plurality of memory blocks may include at least one first memory block and at least one second memory block. A super block may include at least one first memory block and at least one second memory block.

Respective memory blocks included in a super block may be physically different memory blocks, but may logically operate like one memory block. One super block may be a set of memory blocks in which an operation such as read/program/erase is performed simultaneously or within the same time slot or in which an operation such as read/program/erase is performed in an interconnected or interrelated manner. Also, one super block may be a set of memory blocks in which an operation such as read/program/erase corresponding to one command is performed. Further, one super block may be a group of memory blocks which are distinguished in terms of operation among a plurality of memory blocks.

Super block may be a unit for performing a background operation such as garbage collection, wear leveling and read reclaim.

The memory system 100 may improve operation performance by performing a specific operation (e.g., a program operation/an erase operation) in the unit of super block, and may efficiently manage a plurality of memory blocks by performing a background operation such as garbage collection or wear leveling in the unit of super block.

Referring to FIG. 4, the memory controller 120 may group some among the plurality of memory blocks in the memory device 110, into a super block #1 SBLK1, a super block #2 SBLK2 or a super block #3 SBLK3. One among super blocks grouped by the memory controller 120 in this way may be referred to as a first super block.

A specific example in which the memory controller 120 groups a super block is as follows.

For instance, the super block #1 SBLK1 may be configured by grouping the memory block #0 BLK0 of the plane #0 PL0 of the memory die #0 DIE0, the memory block #0 BLK0 of the plane #1 PL1 of the memory die #0 DIE0, the memory block #0 BLK0 of the plane #0 PL0 of the memory die #1 DIE1, the memory block #0 BLK0 of the plane #1 PL1 of the memory die #1 DIE1, the memory block #0 BLK0 of the plane #0 PL0 of the memory die #2 DIE2 and the memory block #0 BLK0 of the plane #1 PL1 of the memory the #2 DIE2, among the plurality of memory blocks in the memory device 110.

For another instance, the super block #2 SBLK2 may be configured by grouping the memory block #1 BLK1 of the plane #0 PL0 of the memory die #1 DIE1, the memory block #1 BLK1 of the plane #1 PL1 of the memory die #1 DIE1, the memory block #1 BLK1 of the plane #0 PL0 of the memory die #2 DIE2, the memory block #1 BLK1 of the plane #1 PL1 of the memory die #2 DIE2, the memory block #1 BLK1 of the plane #0 PL0 of the memory die #3 DIE3 and the memory block #1 BLK1 of the plane #1 PL1 of the memory die #3 DIE3, among the plurality of memory blocks in the memory device 110.

For still another instance, the super block #3 SBLK3 may be configured by grouping the memory block #2 BLK2 of the plane #0 PL0 of the memory die #0 DIE0, the memory block #2 BLK2 of the plane #1 PL1 of the memory die #0 DIE0, the memory block #2 BLK2 of the plane #0 PL0 of the memory die #1 DIE1, the memory block #2 BLK2 of the plane #1 PL1 of the memory die #1 DIE1, the memory block

2 BLK2 of the plane #0 PL0 of the memory die #3 DIE3 and the memory block #2 BLK2 of the plane #1 PL1 of the memory die #3 DIE3, among the plurality of memory blocks in the memory device 110.

In the case where super blocks are configured in this way, the super blocks may be configured over different memory dies. In other words, in the case where a super block includes at least one first memory block and at least one second memory block, such memory blocks may be in different dies. Specifically, the super block #1 SBLK1, as can be seen from FIG. 4, includes memory blocks from both DIE0 and DIE1. The memory die #0 DIE0 in which the memory block #0 BLK0 of the plane #0 PL0 is included and the memory die #2 DIE2 in which the memory block #0 of the plane #1 PL1 is included are different from each other.

The super blocks described above with reference to FIG. 4 include the same number of memory blocks and are configured over the same number of memory dies. Specifically, each of the super block #1 SBLK1, the super block #2 SBLK2 and the super block #3 SBLK3 includes six memory blocks, and is configured over three different memory dies. Accordingly, each of super blocks #1, #2 and #3 is an example of a super block formed of memory blocks from a lesser number of dies than the number of dies that correspond to the channel CH.

Figure 5:
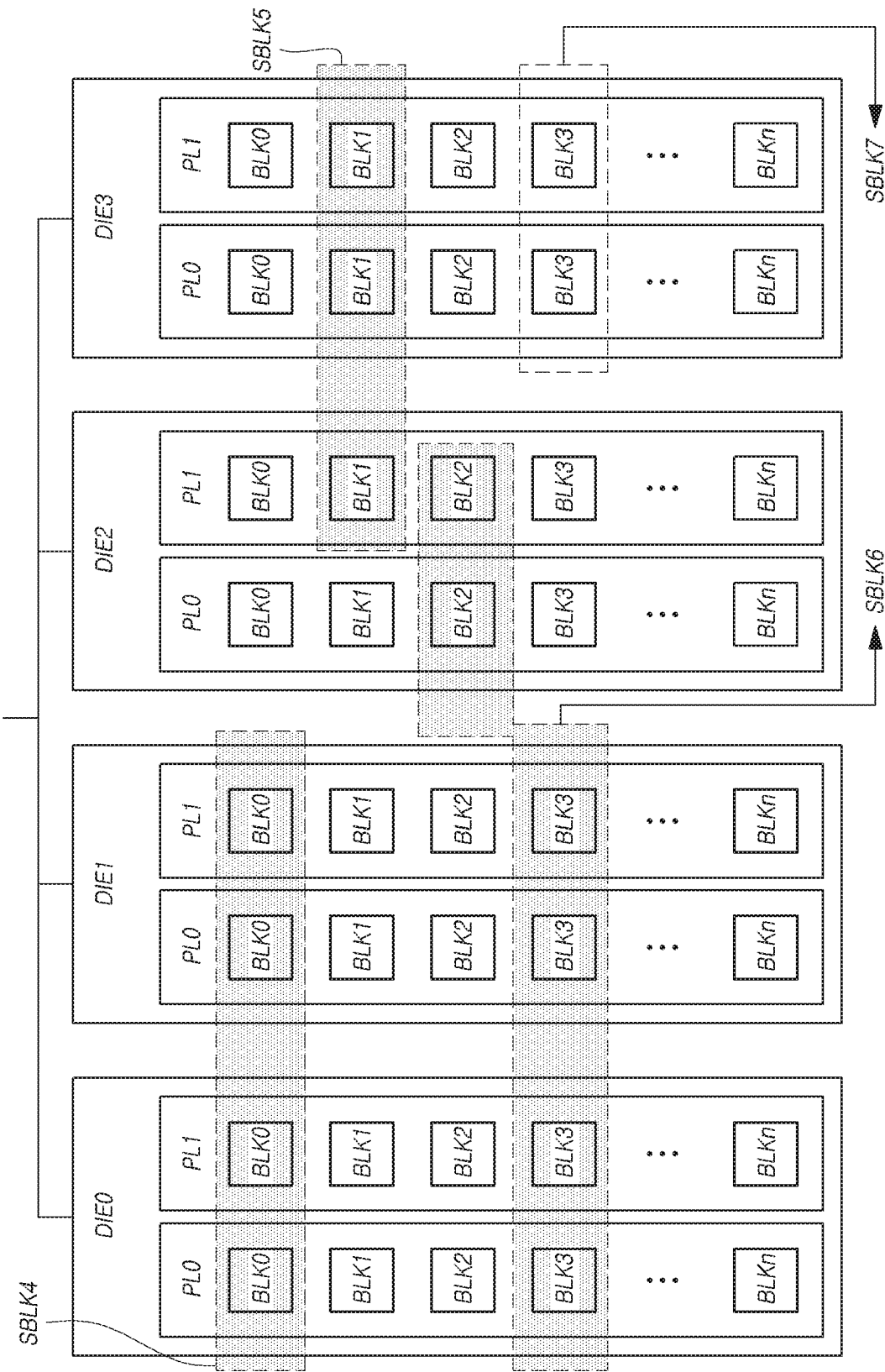
FIG. 5 is a diagram illustrating a representation of another example of configuring super blocks in the memory system in accordance with an embodiment of the disclosure.

However, as illustrated in FIG. 5, super blocks may be configured in such a manner that the numbers of memory blocks in the respective super blocks are different from one another. Furthermore, respective super blocks may be configured over different numbers of memory dies.

FIG. 5 is a diagram illustrating another example of configuring super blocks in the memory system 100 in accordance with an embodiment of the disclosure.

Referring to FIG. 5, the numbers of memory blocks which configure respective super blocks are different from one another. A super block #4 SBLK4 includes four memory blocks, a super block #5 SBLK5 includes three memory blocks, a super block #6 SBLK6 includes six memory blocks, and a super block #7 SBLK7 includes two memory blocks. Namely, the number of memory blocks in a first super block may be different from the number of memory blocks in a second super block different from the first super block.

Moreover, respective super blocks are configured over different numbers of memory dies. The super block #4 SBLK4 and the super block #5 SBLK5 may be configured over two memory dies, the super block #6 SBLK6 may be configured over three memory dies, and the super block #7 SBLK7 may be configured over one memory die.

Regarding super block #6 SBLK6, it may be configured in such a manner that indexes indicating on-plane positions of respective memory blocks are different from each other, as in the case of the memory blocks #2 BLK2 and the memory blocks #3 BLK3.

When a super block is configured over different memory dies as described above, the number of memory dies corresponding to the super block may be determined as follows.

In embodiments of the disclosure, the number of memory dies corresponding to each super block may be less than the number of memory dies corresponding to one channel. The number of memory dies corresponding to a super block may be defined as the number of memory dies each of which includes at least one memory block that is also included in the super block. That is to say, the number of memory dies across which a super block spans may be less than the number of memory dies corresponding to one channel.

Referring to FIGS. 4 and 5, the number of memory dies corresponding to one channel CH is 4, that is, the memory dies DIE0, DIE1, DIE2 and DIE3 correspond to the same channel CH. However, as illustrated in FIG. 4, the number of memory dies corresponding to the super block #1 SBLK1 is 3 (memory dies DIE0, DIE1 and DIE2), which is less than 4. The same is true for super block #2 SBLK2; it includes 3 memory dies DIE1, DIE2 and DIE3, which is less than 4. Also, super block #3 SBLK3 includes 3 memory dies DIE0, DIE1 and DIE3, which is also less than 4. Similarly, as illustrated in FIG. 5, for each of the super block #4 SBLK4, the super block #5 SBLK5, the super block #6 SBLK6, the number of memory dies corresponding thereto is less than 4.

The reason why, in the embodiments of the disclosure, the number of memory dies each super block spans is set to be less than the number of memory dies corresponding to one channel is as follows.

As described above, in one channel, the memory controller 120 and the memory device 110 may sequentially exchange data or commands. In this regard, if processing of data or commands exchanged between the memory controller 120 and the memory device 110 is simultaneously performed in all memory dies corresponding to one super block, processing speed for the data or commands increases.

Therefore, in theory, it is advantageous in terms of performance that the number of memory dies corresponding to one super block is the same as the number of memory dies corresponding to one channel.

However, in this case, if the number of memory dies corresponding to one super block is greater than or equal to a specific value, a performance improvement effect is not induced even though the number of memory dies corresponding to the super block is increased. This is because a size of data or commands exchanged between the memory controller 120 and the memory device 110 for a specific amount of time through one channel is limited.

In addition, if the number of memory dies corresponding to one super block increases, power consumption amount for a specific amount of time also increases since the number of memory dies simultaneously activated increases. In this case, a problem may be caused in that an amount of power used by the memory device 110 exceeds a maximum power consumption limit for the memory device 110 to perform an operation such as read/program/erase for a specific amount of time.

Also, since, as described above, a background operation such as garbage collection or wear leveling is performed in the unit of super block, a time required for performing the background operation increases as the number of memory dies corresponding to one super block increases. Moreover, since the number of memory blocks to or from which data is moved while performing garbage collection or wear leveling proportionally increases as the number of memory dies corresponding to one super block increases, a problem may be caused in that the lifetime of the memory device 110 decreases.

Therefore, in the embodiments of the disclosure, the number of memory dies corresponding to a super block is set to be less than the number of memory dies corresponding to one channel.

The number of memory dies corresponding to a super block may be determined by various methods.

For instance, the number of memory dies corresponding to a super block may be a specific value, which may be the same for all super blocks. As illustrated in FIG. 4, each super block spans or corresponds to 3 memory dies, which is less than the 4 memory dies corresponding to the channel CH.

However, as illustrated in FIG. 5, the number of memory dies corresponding to a super block may be different for each super block. In this regard, the number of memory dies corresponding to each super block may be differently determined depending on at least one control parameter (CP).

Figure 6:
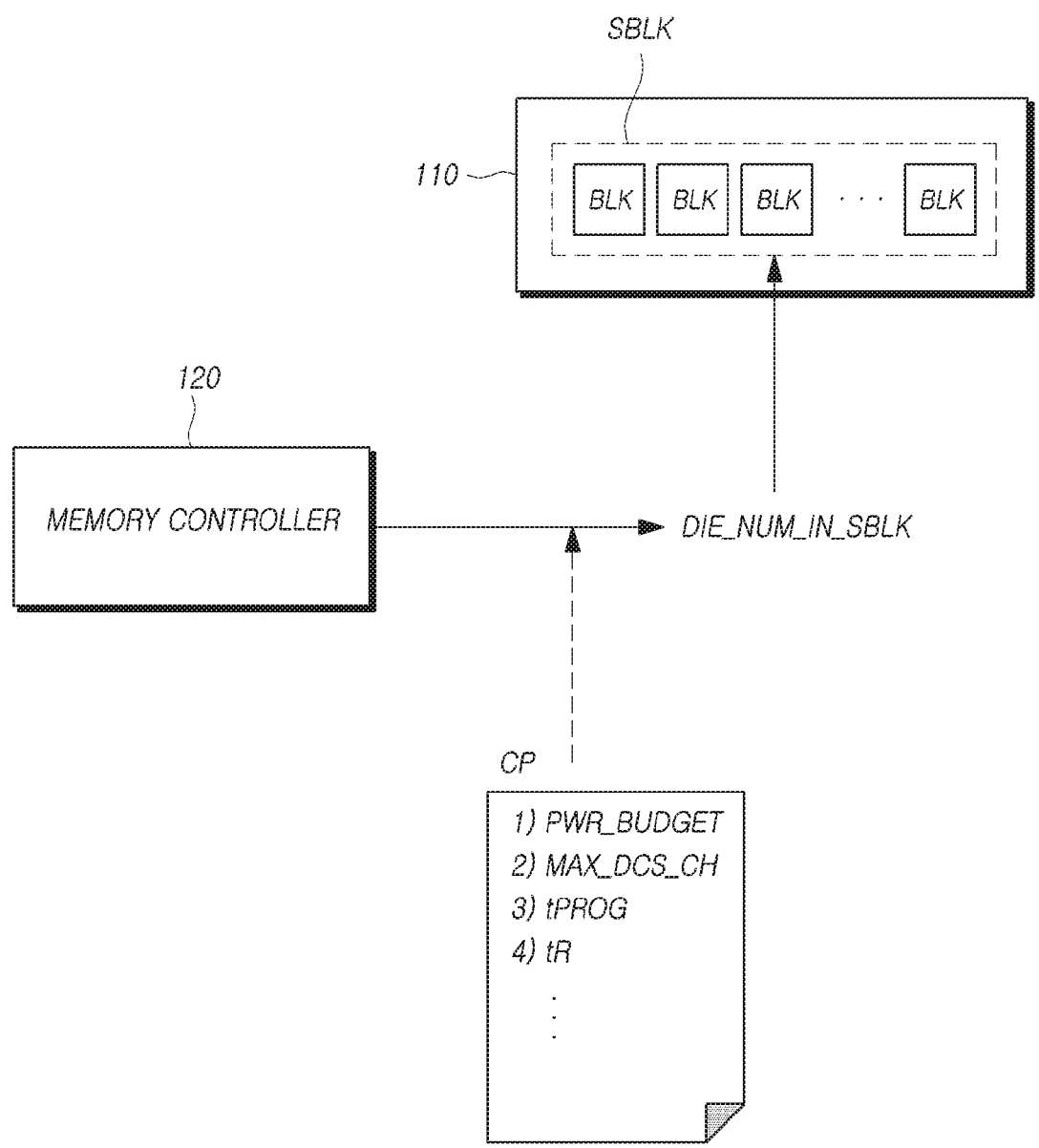
FIG. 6 is a diagram illustrating control parameters for determining the number of memory dies corresponding to a super block in the memory system in accordance with an embodiment of the disclosure.

FIG. 6 is a diagram illustrating control parameters CP for determining the number of memory dies corresponding to a super block SBLK in the memory system 100 in accordance with an embodiment of the disclosure.

Referring to FIG. 6, when the memory controller 120 configures a super block SBLK, the number of memory dies corresponding to the super block SBLK DIE_NUM_IN_SBLK may be determined by one or more control parameters CP.

For example, such control parameters CP may include at least one among a power budget information PWR_BUDGET of the memory controller 120, a maximum data communication speed MAX_DCS_CH between the memory controller 120 and the host 50, a program time tPROG, a read sensing time tR, and the like. The memory controller 120 may determine the number of memory dies corresponding to the super block SBLK DIE_NUM_IN_SBLK, by using the one or more control parameters CP, and may configure the super block SBLK based on the determined number DIE_NUM_IN_SBLK. According to this fact, a size of the super block SBLK in terms of the number of dies that it spans may be determined.

Values of the control parameters CP may be indicated in various ways. For instance, values of control parameters CP may be values (e.g., the program time tPROG and the read sensing time tR) set in advance in a process in which the memory system 100 is manufactured. In this case, the values of the control parameters CP may be indicated by firmware for the memory system 100.

For another instance, control parameters CP may be values that are dynamically indicated by the host 50 or an external sensor.

Figure 7:
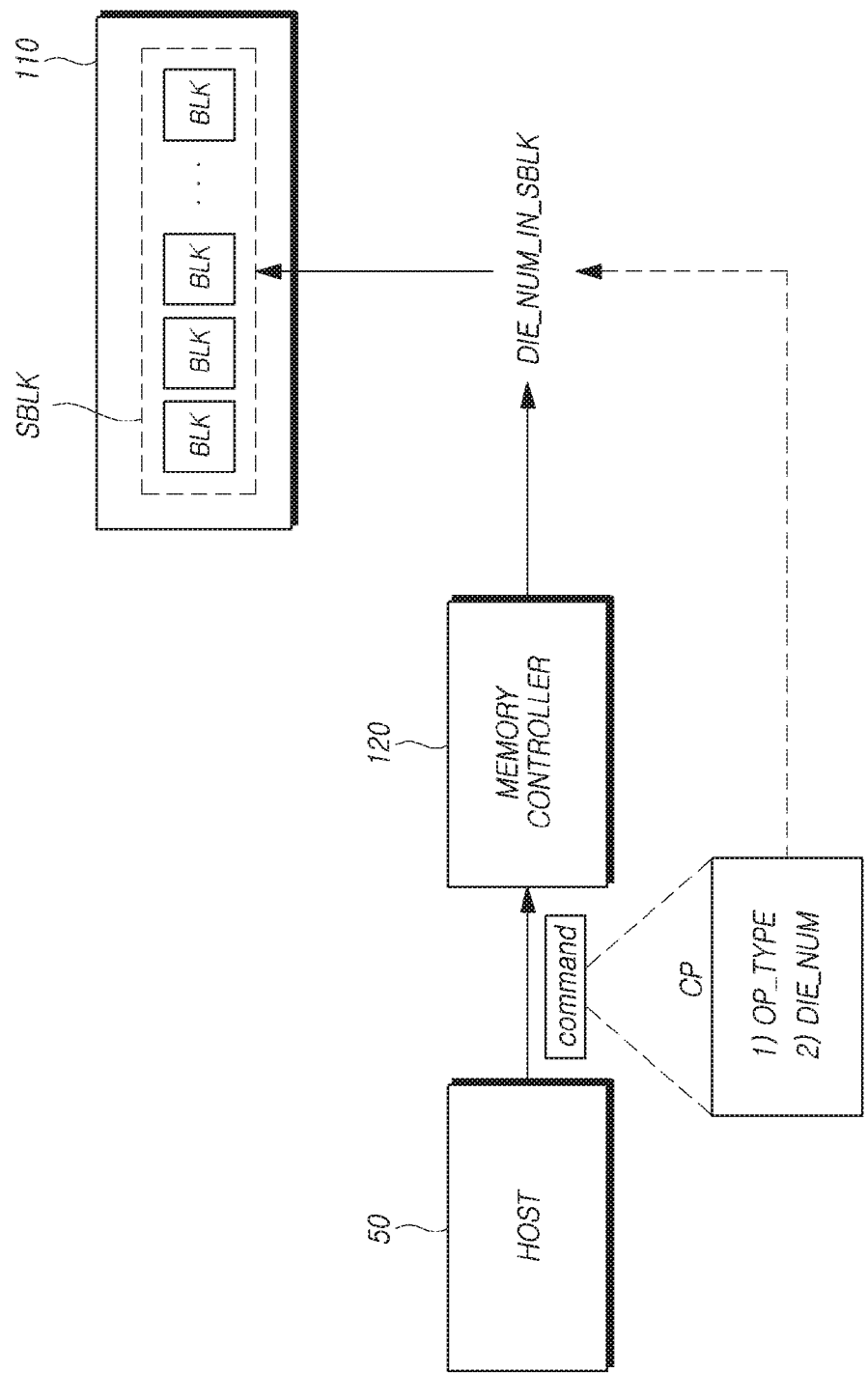
FIG. 7 is a diagram illustrating an operation in which some control parameters are indicated by a command received from a host, in accordance with an embodiment of the disclosure.

With reference to FIG. 7, a case where some among the control parameters CP are dynamically indicated from the host 50 is described. In general, a dynamically indicated CP represents a parameter of the memory system that dynamically changes depending on the operating conditions. The host 50 recognizes these changes in operating conditions and changes the dynamically indicated CP accordingly.

FIG. 7 is a diagram illustrating an operation in which some among the control parameters CP are indicated by a command received from the host 50, in the memory system 100 in accordance with an embodiment of the disclosure.

Referring to FIG. 7, the host 50 may transmit a command indicating a control parameter CP described above, to the memory controller 120. The command may include a control parameter CP for allowing the memory controller 120 to determine the number of memory dies corresponding to a super block SBLK DIE_NUM_IN_SBLK, or may include information for allowing the memory controller 120 to select (determine) a control parameter CP (e.g., a control parameter identification information). The memory controller 120 may check the value of a corresponding control parameter CP in the command received from the host 50, and thereby, may determine the number of memory dies corresponding to the super block SBLK DIE_NUM_IN_SBLK.

A control parameter CP indicated by the command received from the host 50 may be, for example, an operation type OP_TYPE (e.g., read/program/erase) of the command.

On the other hand, a control parameter CP indicated by the command received from the host 50 may be, for another example, the number of memory dies corresponding to the super block SBLK DIE_NUM_IN_SBLK.

A specific example in which, in the case where a value of at least one control parameter CP is indicated in various ways as described above, the number DIE_NUM_IN_SBLK is determined by the indicated control parameter CP is described below.

Figure 8:
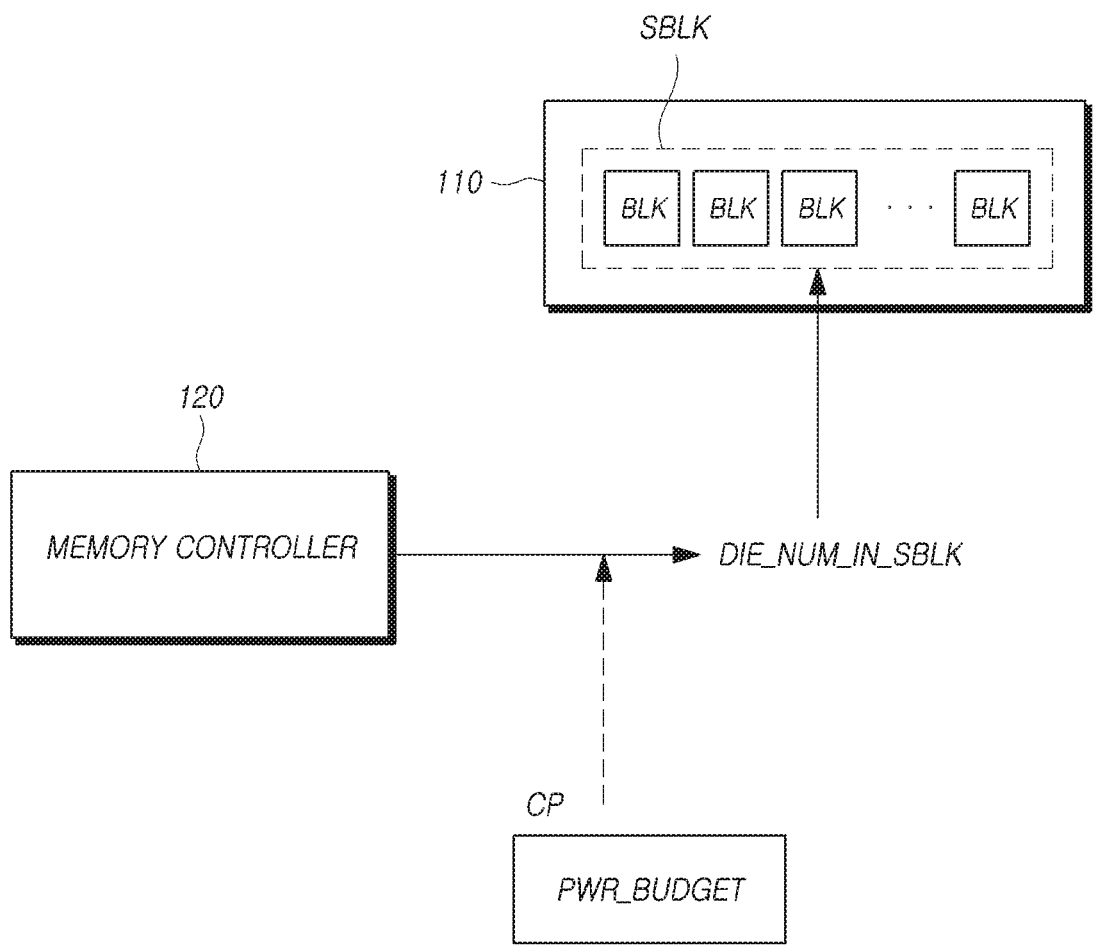
FIGS. 8 to 10 are diagrams to assist in the explanation of examples, in each of which the number of memory dies corresponding to a super block is determined by at least one control parameter, in accordance with embodiments of the disclosure.
Figure 9:
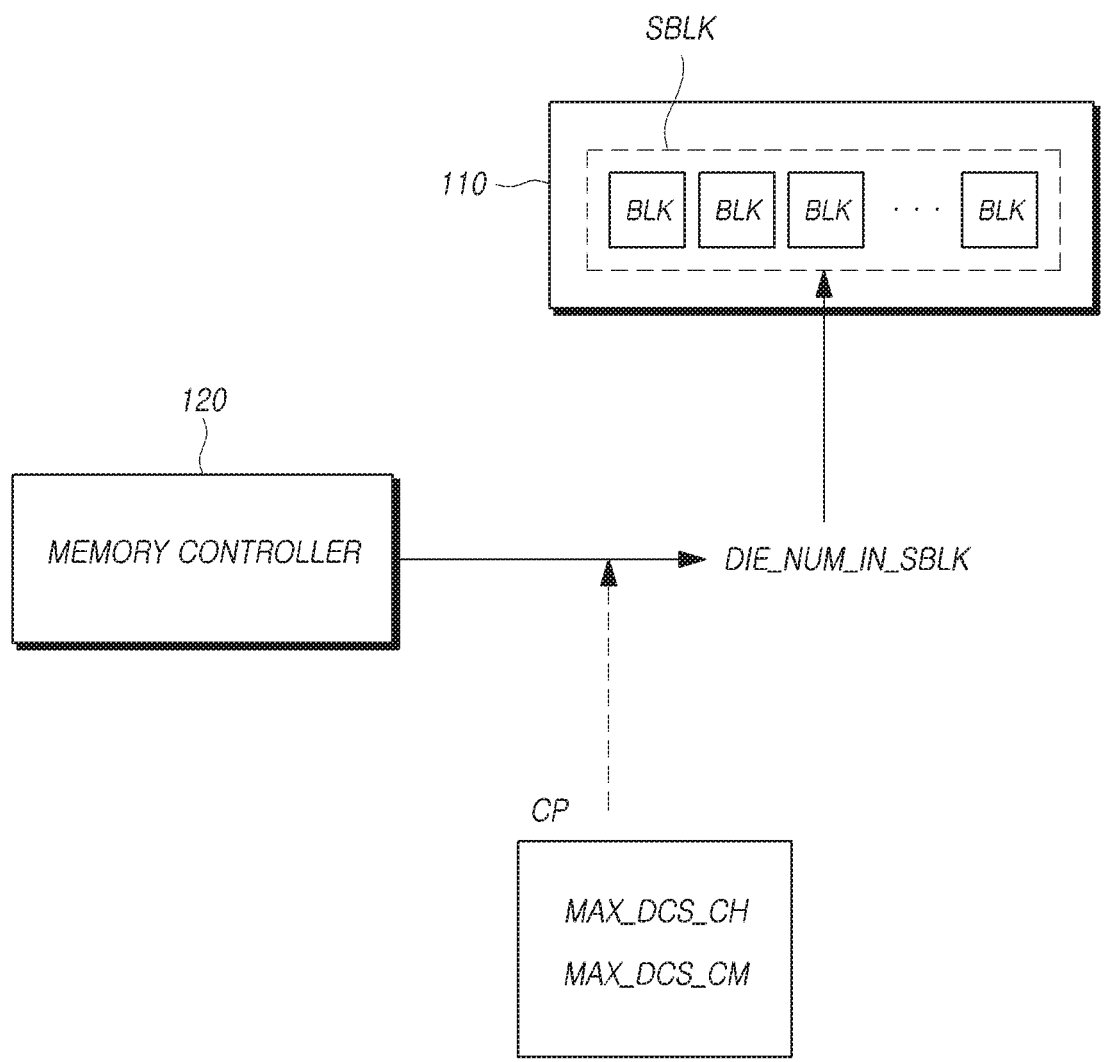
Figure 10:
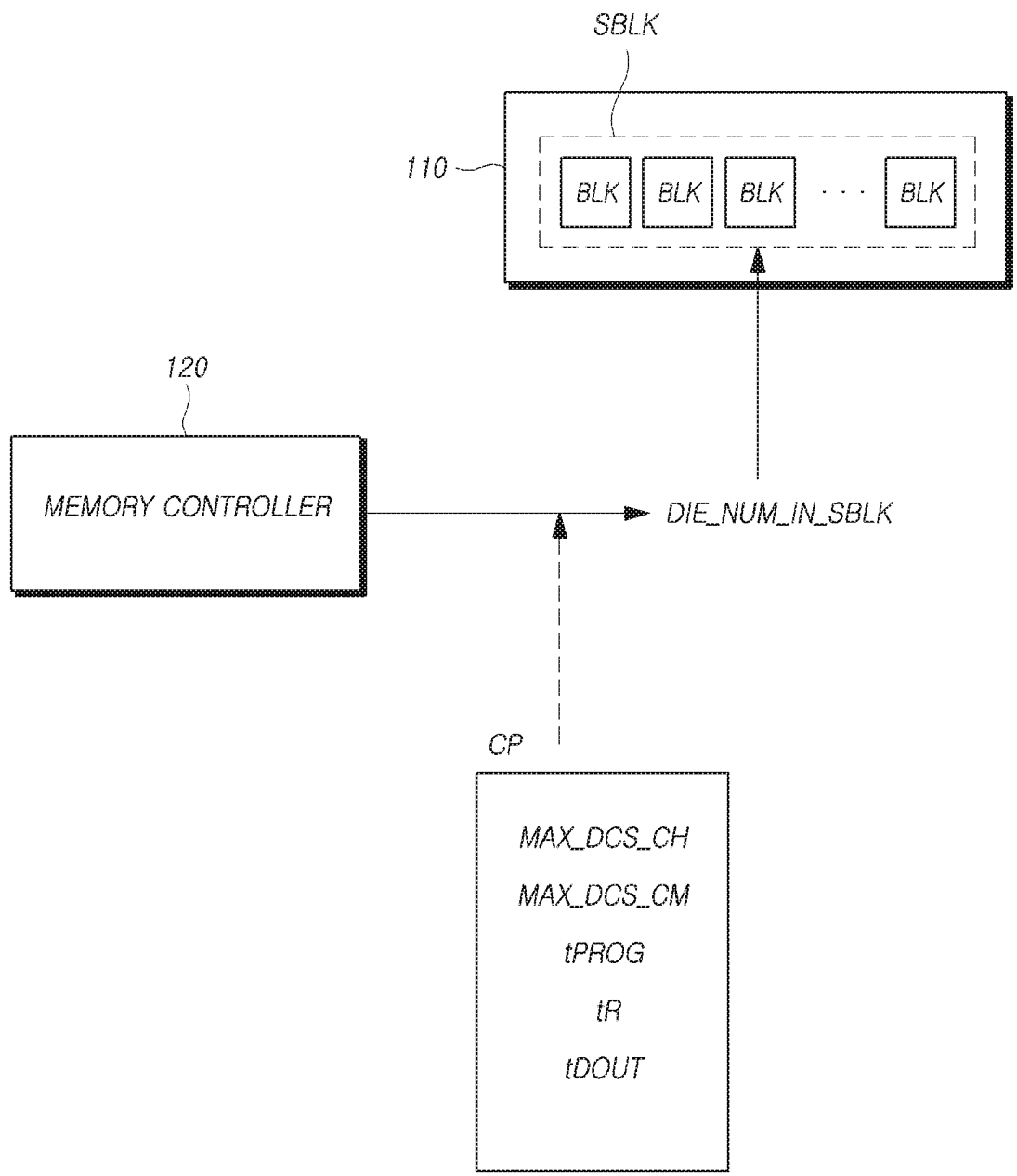

FIGS. 8 to 10 are diagrams to assist in the explanation of examples, in each of which the number of memory dies corresponding to a super block SBLK is determined by at least one control parameter CP, in the memory system 100 in accordance with embodiments of the disclosure.

First, referring to FIG. 8, a control parameter CP used to determine the number of memory dies corresponding to the super block SBLK DIE_NUM_IN_SBLK may include maximum power budget information PWR_BUDGET of the memory device 110.

The maximum power budget information PWR_BUDGET of the memory device 110 means information on an amount of power consumed for the memory device 110 to perform an operation such as read/program/erase for a specific amount of time.

In general, the maximum power budget information PWR_BUDGET of the memory device 110 may be a value that is set in advance depending on a characteristic (e.g., a storage capacity/a read speed/a program speed) of the memory device 110. However, the maximum power budget information PWR_BUDGET of the memory device 110 may be dynamically determined based on a change in an operation voltage supplied to the memory device 110, or the like.

For instance, it is assumed that a maximum power budget of the memory device 110 is currently 10 and power to be consumed when one memory die is activated is 3. In this case, the number of memory dies corresponding to the super block SBLK DIE_NUM_IN_SBLK may be 3 as the whole number result obtained by dividing 10 by 3.

Referring to FIG. 9, a control parameter CP used to determine the number of memory dies corresponding to the super block SBLK DIE_NUM_IN_SBLK may include one or at least two among a maximum data communication speed MAX_DCS_CH between the memory controller 120 and the host 50, a maximum data communication speed MAX_DCS_CM between the memory controller 120 and the memory device 110, and the like.

If the maximum data communication speed MAX_DCS_CH between the memory controller 120 and the host 50 increases, a size of data transmitted through one channel for a specific amount of time increases. Therefore, the number of memory dies activated to simultaneously process the entire data transmitted increases. Thus, if the maximum data communication speed MAX_DCS_CH between the memory controller 120 and the host 50 increases, the number of memory dies corresponding to the super block SBLK DIE_NUM_IN_SBLK may be increased.

Communication between the memory controller 120 and the host 50 is performed through the host interface 121 in the memory controller 120. Hence, a maximum data communication speed between the memory controller 120 and the host 50 may be referred to as a host interface speed.

On the other hand, if the maximum data communication speed MAX_DCS_CM between the memory controller 120 and the memory device 110 increases, a size of data processed by a memory block included in one memory die for a specific amount of time increases. Therefore, the number of memory dies necessary to be activated to simultaneously process entire transmitted data decreases. Thus, if the maximum data communication speed MAX_DCS_CM between the memory controller 120 and the memory device 110 increases, the number of memory dies corresponding to the super block SBLK DIE_NUM_IN_SBLK may be decreased conversely.

Communication between the memory controller 120 and the memory device 110 is performed through the memory interface 122 in the memory controller 120. Hence, a maximum data communication speed between the memory controller 120 and the memory device 110 may be referred to as a memory interface speed.

Referring to FIG. 10, control parameters CP used to determine the number of memory dies corresponding to the super block SBLK DIE_NUM_IN_SBLK may further include one or more among a program time tPROG, a read sensing time tR and a data output time tDOUT of a memory block in the super block SBLK.

The program time tPROG of a memory block is a time during which data inputted through a data input terminal of the memory device 110 is programmed to memory cells in the memory block.

The read sensing time tR of a memory block is a time during which data stored in the memory block in the memory device 110 is stored in a buffer in the memory device 110.

The data output time tDOUT of a memory block is a time during which data stored in a buffer in the memory device 110 is outputted and transmitted to the memory controller 120.

As the program time tPROG of a memory block increases, an amount of data programmed in one memory block for a specific amount of time decreases. Therefore, in order to program a specific size of data in the super block SBLK for a specific amount of time, the number of memory dies corresponding to the super block SBLK DIE_NUM_IN_SBLK may be increased in proportion to the program time tPROG of a memory block.

On the other hand, as the read sensing time tR of a memory block or the data output data tDOUT of a memory block increases, an amount of data read from one memory block for a specific amount of time decreases. Therefore, in order to read a specific size of data from the super block SBLK for a specific amount of time, the number of memory dies corresponding to the super block SBLK DIE_NUM_IN_SBLK may be increased in proportion to the read sensing time tR or the data output time tDOUT of a memory block.

A specific example in which the number of memory dies corresponding to the super block SBLK DIE_NUM_IN_SBLK is determined based on the control parameters CP described above with reference to FIGS. 9 and 10 is described.

For instance, it is assumed that the maximum data communication speed MAX_DCS_CH between the memory controller 120 and the host 50 is 800 MBps, the program time tPROG is 1320 us and a data capacity of one memory block is 256 KB. In this case, a maximum size of data inputted from the host 50 for 1320 us is $800 \text{ MB} * 1320 * 10^{-6} \approx 1.05$ MB. In order to process the data of 1.05 MB, at least five 256 KB memory blocks in different memory dies are needed. Therefore, the number of memory dies corresponding to the super block SBLK DIE_NUM_IN_SBLK may be determined as 5.

For another instance, it is assumed that the maximum data communication speed MAX_DCS_CH between the memory controller 120 and the host 50 is 1600 MBps, the program time tPROG is 1200 us and a data capacity of one memory block is 256 KB. In this case, a maximum size of data inputted from the host 50 for 1200 us is $1600 \text{ MB} * 1200 * 10^{-6} \approx 1.92$ MB. In order to process the data of 1.92 MB, at least eight 256 KB memory blocks in different memory dies are needed. Therefore, the number of memory dies corresponding to the super block SBLK DIE_NUM_IN_SBLK may be determined as 8.

Which control parameter CP of the program time tPROG, the read sensing time tR and the data output time tDOUT of a memory block included in the super block SBLK is to be used in which ratio in determining the number of memory dies corresponding to the super block SBLK DIE_NUM_IN_SBLK may be changed by a characteristic of an operation to be performed for the super block SBLK.

For instance, if a read operation is seldom performed and a program operation is mainly performed for the super block SBLK, the number of memory dies corresponding to the super block SBLK may be determined based on the program time tPROG.

For another instance, if a program operation is seldom performed and a read operation is mainly performed for the super block SBLK, the number of memory dies corresponding to the super block SBLK DIE_NUM_IN_SBLK may be determined based on the read sensing time tR or the data output time tDOUT.

On the other hand, if a read operation and a program operation are performed for the super block SBLK at a specific ratio, the number of memory dies corresponding to the super block SBLK DIE_NUM_IN_SBLK may be determined by appropriately reflecting the program time tPROG, the read sensing time tR or the data output time tDOUT.

Figure 11:
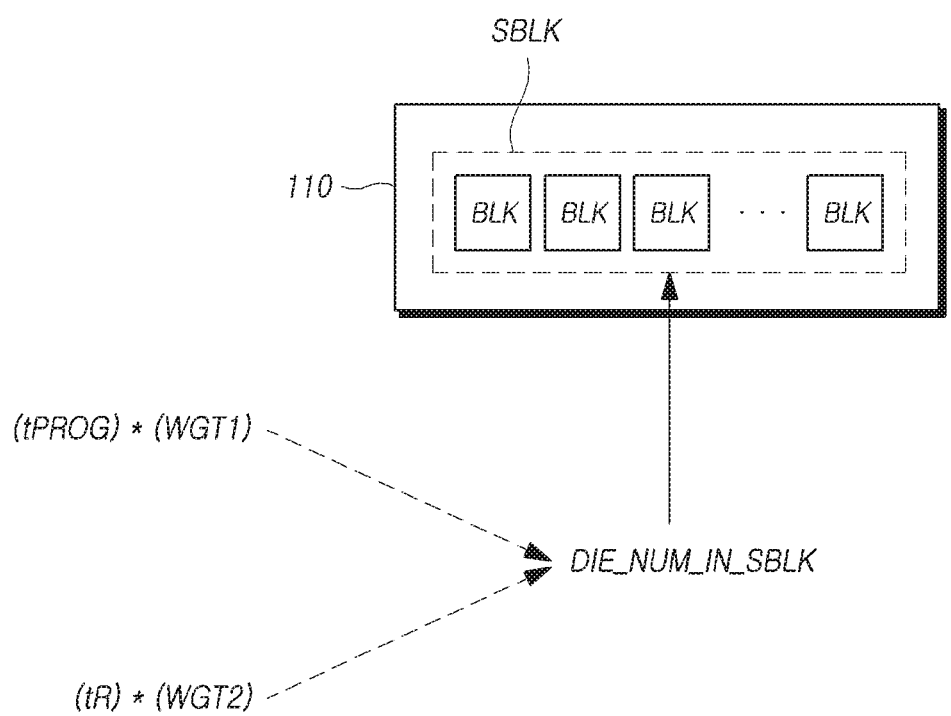
FIGS. 11 and 12 are diagrams to assist in the explanation of examples, in each of which the number of memory dies corresponding to a super block is determined depending on a characteristic of an operation performed for the super block, in accordance with embodiments of the disclosure.
Figure 12:
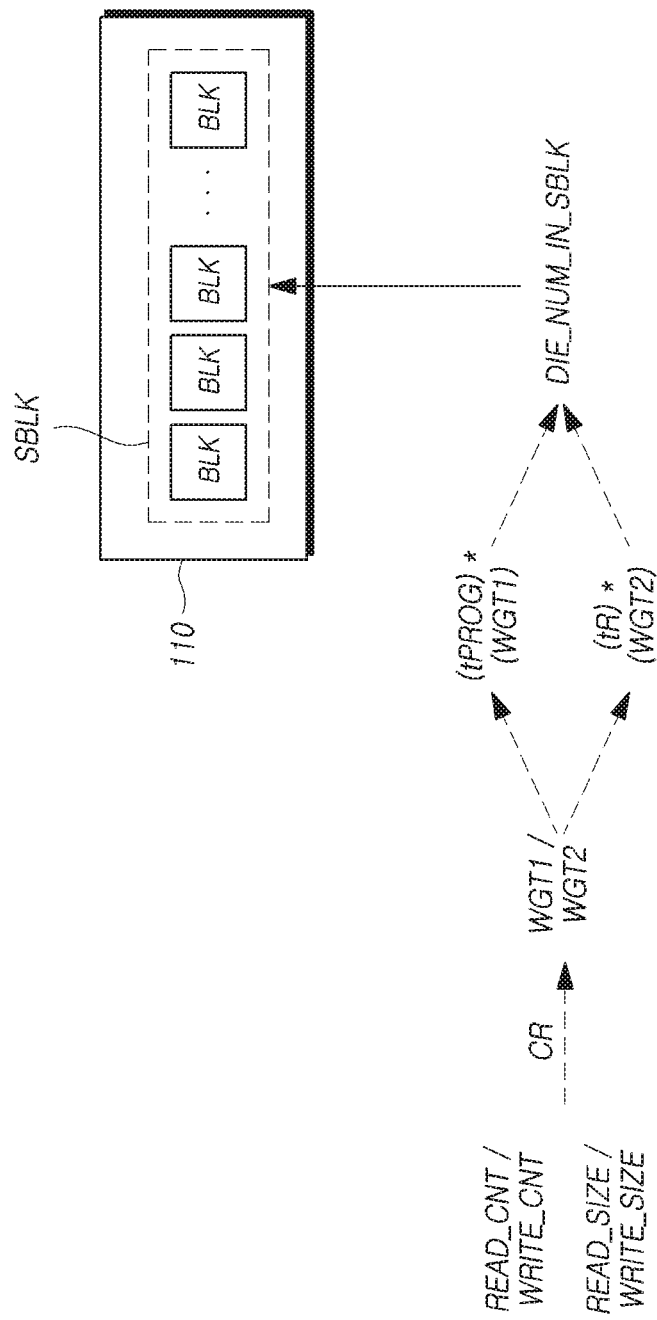

FIGS. 11 and 12 are diagrams to assist in the explanation of examples in each of which the number of memory dies corresponding to a super block SBLK DIE_NUM_IN_SBLK is determined depending on a characteristic of an operation performed for the super block SBLK, in the memory system 100 in accordance with embodiments of the disclosure.

Referring to FIG. 11, the number of memory dies corresponding to the super block SBLK DIE_NUM_IN_SBLK may be determined differently depending on a value obtained by weighting a program time tPROG of a memory block in the super block SBLK, with a first weight WGT1, and a value obtained by weighting a read sensing time tR with a second weight WGT2.

That is to say, although both the program time tPROG and the read sensing time tR are reflected in determining the number of memory dies corresponding to the super block SBLK DIE_NUM_IN_SBLK, degrees to which the program time tPROG and the read sensing time tR are reflected may vary.

A method of determining the first weight WGT1 and the second weight WGT2 is described with reference to FIG. 12.

Referring to FIG. 12, the first weight WGT1 and the second weight WGT2 may be determined by a control ratio CR indicating which of a read operation and a program operation is mainly performed in the super block SBLK.

The control ratio CR may vary depending on a ratio of a program operation count to a read operation count corresponding for the super block SBLK for a specific amount of time. This is based on the assumption that the weight of an operation is determined based on an operation count.

On the other hand, the control ratio CR may vary depending on a ratio of a program data size to a read data size corresponding to the super block SBLK for a specific amount of time. This is based on the assumption that the weight of an operation is determined based on a size of data corresponding to the operation, not on an operation count.

For instance, it is assumed that, for a specific amount of time (e.g., 1 s), 100 read operations have been performed for the super block SBLK and 10 KB data has been read in each read operation and that 10 program operations have been performed for the super block SBLK and 100 KB data has been programmed in each program operation.

In this case, while the ratio of read operations performed to program operation performed in the specific amount of time is 10, the entire read data size and the entire program data size are the same, i.e., 1000 KB. In this case, the control ratio CR may be determined to be 1000 KB/1000 KB=1, not 10/100=0.1.

When the above-described method is used, in the case where the weight of a read operation is greater than or equal to a specific threshold value, it may be determined that the influence of a program operation is low. Thus, the number of memory dies corresponding to the super block SBLK DIE_NUM_IN_SBLK may be determined depending on the read sensing time tR regardless of the program time tPROG associated with the program operation.

On the other hand, in the case where the weight of a program operation is greater than or equal to a specific threshold value, it may be determined that the influence of a read operation is low. Thus, the number of memory dies corresponding to the super block SBLK DIE_NUM_IN_S-BLK may be determined depending on the program time tPROG regardless of the read sensing time tR associated with the read operation.

An operation method of obtaining the number of memory dies corresponding to a super block SBLK DIE_NUM_IN__SBLK, by comparing the above-described control ratio CR with a threshold value, is described below with reference to FIG. 13.

Figure 13:
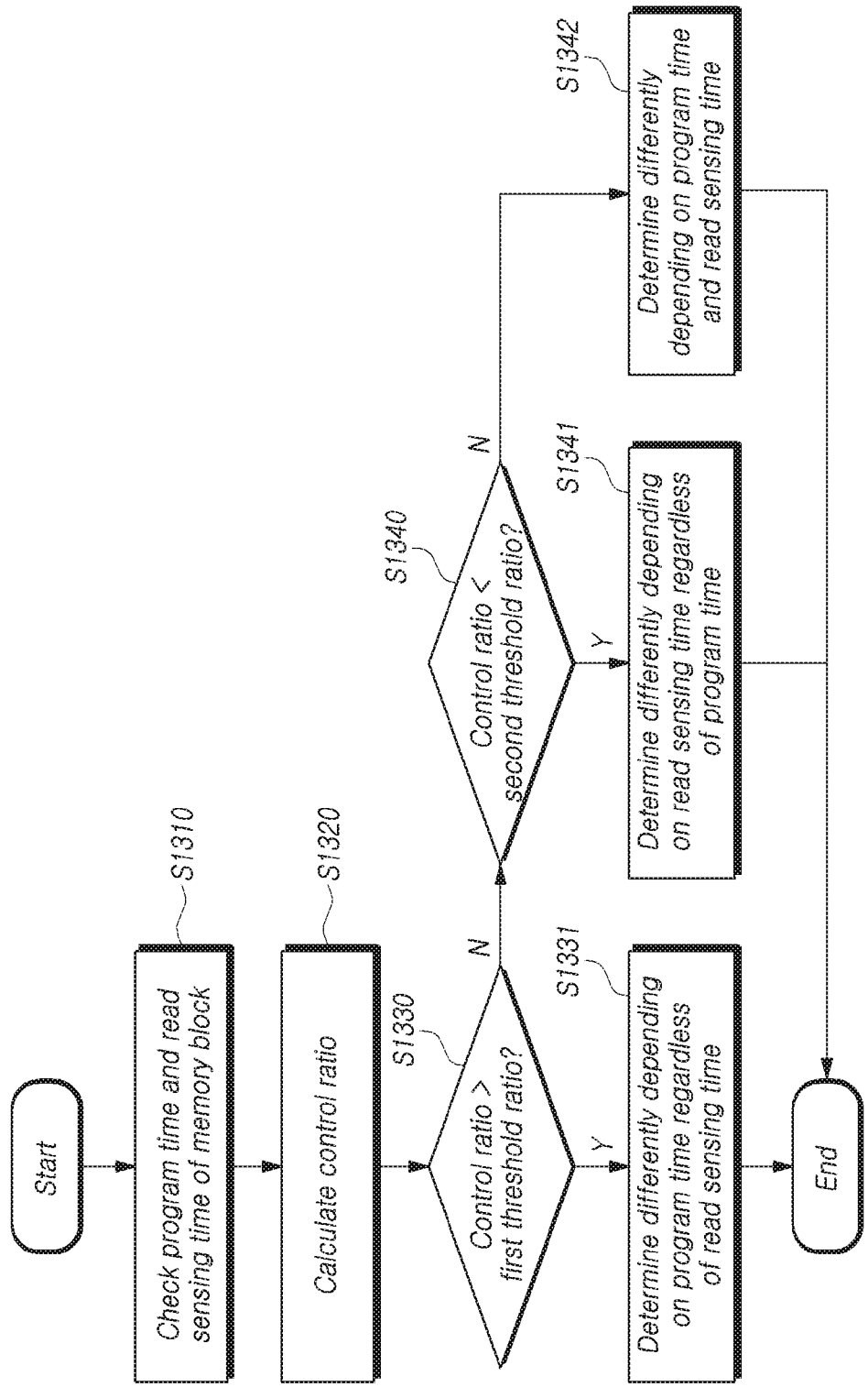
FIG. 13 is a flow chart to assist in the explanation of the operation method illustrated in FIG. 12.

FIG. 13 is a flow chart to assist in the explanation of the operation method described above with reference to FIG. 12. In an embodiment, such method may be performed by the memory controller 120.

Referring to FIG. 13, at step S1310, the memory controller 120 may check a program time tPROG and a read sensing time tR of a memory block in a super block SBLK.

At step S1320, the memory controller 120 may calculate a control ratio CR indicating which of a read operation and a program operation is mainly performed in the super block SBLK, as described above with reference to FIG. 12.

Thereafter, at step S1330, the memory controller 120 may determine whether the control ratio CR is greater than a specific first threshold ratio. If the control ratio CR is greater than the first threshold ratio, it means that the weight or proportion of a program operation is high relative to a read operation. Thus, if the control ratio CR is greater than the first threshold ratio (S1330—Y), at step S1331, the memory controller 120 may determine the number of memory dies corresponding to the super block SBLK DIE_NUM_IN_S-BLK, differently depending on the program time tPROG, regardless of the read sensing time tR.

If the control ratio CR is less than the first threshold ratio (S1330—N), at step S1340, the memory controller 120 may determine whether the control ratio CR is less than a second threshold ratio. The second threshold ratio is less than the first threshold ratio. If the control ratio CR is less than the second threshold ratio, it means that the weight or proportion of a read operation is high relative to a program operation. Thus, if the control ratio CR is less than the second threshold ratio (S1340—Y), at step S1341, the memory controller 120 may determine the number of memory dies corresponding to the super block SBLK DIE_NUM_IN_SBLK, differently depending on the read sensing time tR, regardless of the program time tPROG.

If the control ratio CR is less than the first threshold ratio but is greater than the second threshold ratio (S1340—N), at step S1342, the memory controller 120 may determine the number of memory dies corresponding to the super block SBLK DIE_NUM_IN_SBLK, differently depending on the program time tPROG and the read sensing time tR.

Figure 14:
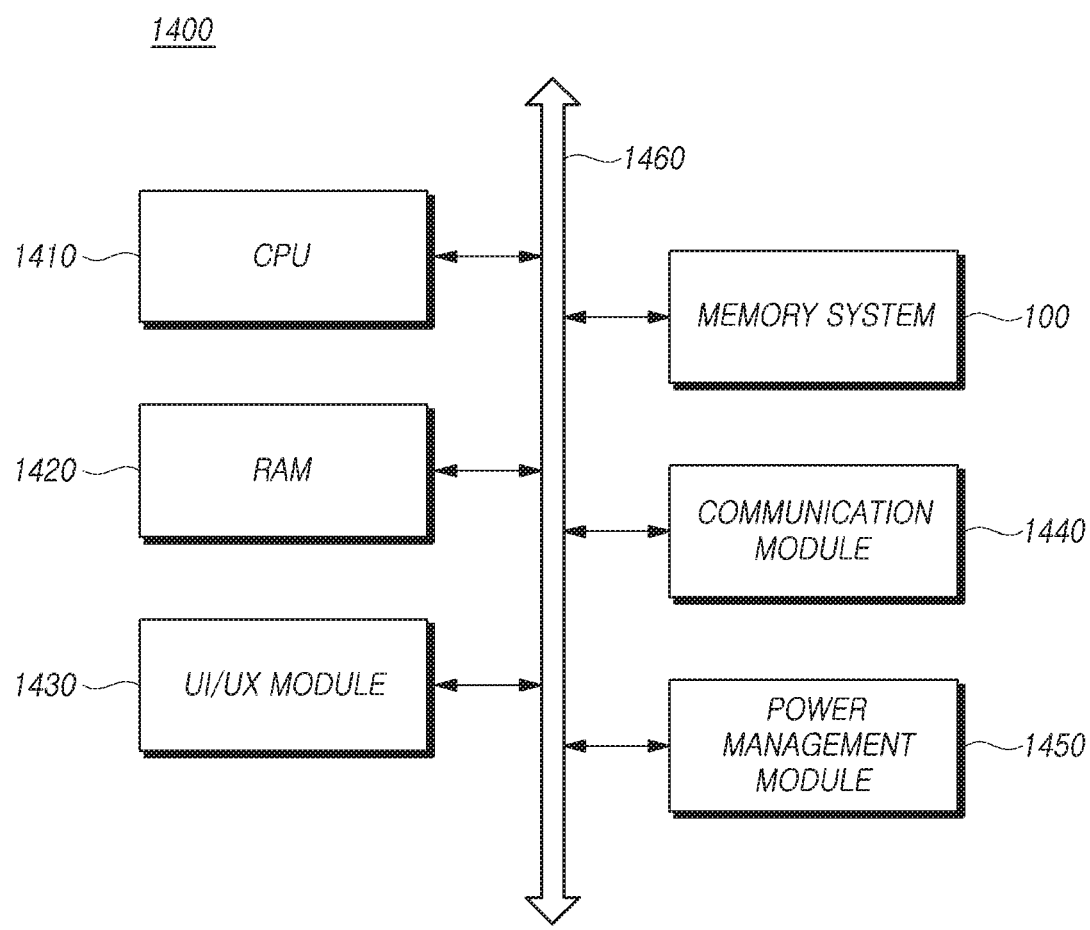
FIG. 14 is a block diagram schematically illustrating a computing system in accordance with embodiments of the disclosure.

FIG. 14 is a block diagram schematically illustrating a computing system 1400 in accordance with embodiments of the disclosure.

Referring to FIG. 14, the computing system 1400 may include a memory system 100, a central processing unit (CPU) 1410 for controlling general operations of the computing system 1400, a RAM 1420 for storing data and information related with the operations of the computing system 1400, a UI/UX (user interface/user experience) module 1430 for providing use environment to a user, a communication module 1440 for communicating with an external device in a wired and/or wireless manner and a power management module 1450 for managing power used by the computing system 1400, which are electrically coupled to a system bus 1460.

The computing system 1400 may include a PC (personal computer), a mobile terminal such as a smartphone and a tablet or various electronic devices.

The computing system 1400 may further include a battery for supplying an operating voltage, and may further include an application chipset, a graphic-related module, a camera image processor (CIS), a DRAM and the like. As those skilled in the art understand the computing system 1400 may include other components.

The memory system 100 may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM). In addition, the memory system 100 may be realized as any of various types of storage devices, and may be mounted in various electronic devices.

By the embodiments of the disclosure described above, it is possible to provide the memory system 100, the memory controller 120 and the memory device 110 which can flexibly configure a super block while improving the performance of a read, program or erase operation for the super block.

Also, by the embodiments of the disclosure, it is possible to provide the memory system 100, the memory controller 120 and the memory device 110 which can increase the efficiency of a background operation such as garbage collection or wear leveling.

Although various embodiments of the disclosure have been illustrated and described, those skilled in the art will appreciate in light of the present disclosure that various modifications, additions and substitutions are possible, without departing from the scope and spirit of the disclosure. Therefore, the disclosed embodiments should be considered in a descriptive sense only and not for limiting the scope of the invention. The scope of the invention is defined by the appended claims and their equivalents.

What is claimed is:

1. A memory system comprising:
a memory device comprising a plurality of memory dies comprising respective groups of memory blocks, which collectively define a plurality of memory blocks in the memory device; and
a memory controller configured to control the memory device,
wherein at least two of the plurality of memory dies correspond to one channel,
wherein the memory controller groups a first set of the plurality of memory blocks into a first super block,
wherein a number of memory dies corresponding to the first super block is less than a number of memory dies corresponding to the channel, and the number of memory dies corresponding to the first super block is determined differently depending on which of one or more control parameters are received by the memory controller, and
wherein the one or more control parameters comprise at least one of a maximum data communication speed between the memory controller and a host and a maximum data communication speed between the memory controller and the memory device.

2. The memory system according to claim 1,
wherein the memory controller groups a second set of the plurality of memory blocks into a second super block different from the first super block, and
wherein a number of memory blocks in the first super block is different from a number of memory blocks in the second super block.

3. The memory system according to claim 1, wherein the one or more control parameters comprise a maximum power budget information on the memory device.

4. The memory system according to claim 3, wherein the one or more control parameters further comprise one or more of a program time, a read sensing time and a data output time of each of the memory blocks in the first super block.

5. The memory system according to claim 4, wherein the number of memory dies corresponding to the first super block is determined differently depending on a value obtained by weighting the program time with a first weight and a value obtained by weighting the read sensing time with a second weight.

6. The memory system according to claim 5, wherein the first weight and the second weight are determined by a control ratio that varies depending on a ratio of a program operation count to a read operation count for the first super block for a specific amount of time or a ratio of a program data size to a read data size for the first super block for the specific amount of time.

7. The memory system according to claim 6, wherein the number of memory dies corresponding to the first super block varies depending on the program time regardless of the read sensing time, when the control ratio is greater than or equal to a first threshold ratio.

8. The memory system according to claim 7,
wherein the number of memory dies corresponding to the first super block varies depending on the read sensing time regardless of the program time, when the control ratio is less than or equal to a second threshold ratio, and
wherein the second threshold ratio is less than the first threshold ratio.

9. A memory controller comprising:
a memory interface configured to communicate with a memory device comprising a plurality of memory dies comprising respective groups of memory blocks, which collectively define a plurality of memory blocks in the memory device; and
a control circuit configured to control the memory device,
wherein at least two of the plurality of memory dies correspond to one channel,
wherein the control circuit groups a first set of the plurality of memory blocks into a first super block,
wherein a number of memory dies corresponding to the first super block is less than a number of memory dies corresponding to the channel, and the number of memory dies corresponding to the first super block is determined differently depending on which of one or more control parameters are received by the control circuit, and
wherein the one or more control parameters comprise at least one of a maximum data communication speed between the memory controller and a host and a maximum data communication speed between the memory controller and the memory device.

10. The memory controller according to claim 9,
wherein the control circuit groups a second set of the plurality of memory blocks into a second super block different from the first super block, and
wherein a number of memory blocks in the first super block is different from a number of memory blocks in the second super block.

11. The memory controller according to claim 9, wherein the one or more control parameters further comprise one or more of a program time, a read sensing time and a data output time of each of the memory blocks in the first super block.

12. The memory controller according to claim 11, wherein the number of memory dies corresponding to the first super block is determined differently depending on a value obtained by weighting the program time with a first weight and a value obtained by weighting the read sensing time with a second weight.

13. A memory device comprising:
a plurality of memory dies comprising respective groups of memory blocks, which collectively define a plurality of memory blocks of the memory device,
wherein at least two of the plurality of memory dies correspond to one channel,
wherein a first set of the plurality of memory blocks are grouped into a first super block,
wherein a number of memory dies corresponding to the first super block is less than a number of memory dies corresponding to the channel, and the number of memory dies corresponding to the first super block is determined differently depending on which of one or more control parameters are applied, and
wherein the one or more control parameters comprise at least one of a maximum data communication speed between a memory controller and a host and a maximum data communication speed between the memory controller and the memory device.

14. The memory device according to claim 13,
wherein a second set of the plurality of memory blocks are grouped into a second super block different from the first super block, and
wherein a number of memory blocks in the first super block is different from a number of memory blocks in the second super block.

15. The memory device according to claim 14, wherein the one or more control parameters further comprise one or more of a program time, a read sensing time and a data output time of each of the memory blocks in the first super block.

16. The memory device according to claim 15, wherein the number of memory dies corresponding to the first super block is determined differently depending on a value obtained by weighting the program time with a first weight and a value obtained by weighting the read sensing time with a second weight.

17. A memory system comprising:
a memory device including plural dies each having plural memory blocks; and
a controller configured to configure a super block by selecting at least one of the memory blocks from each of a specific number of dies, which the specific number is at least two,
wherein the controller determines the specific number of dies based on one or more pieces of information including:
a maximum power budget of the memory device,
a communication speed between the controller and a host,
a communication speed between the controller and the memory device, and
an operation-based time of a memory block in the super block,
wherein the number of dies corresponding to the super block is determined differently depending on which of one or more control parameters are applied, and
wherein the one or more control parameters comprise at least one of a maximum data communication speed between the controller and a host and a maximum data communication speed between the controller and the memory device.

* * * * *